(12) United States Patent
Baxivanelis et al.

(10) Patent No.: US 6,224,300 B1
(45) Date of Patent: May 1, 2001

(54) CUTTING INSERT FOR SHAPING BY CHIPPING

(75) Inventors: Konstantin Baxivanelis, Besigheim; Jacek Kruszynski, Stuttgart; Henry Schuett, Sachsenheim; Hans Haidinger, Pleidelsheim; Helmut Morlock, Loechgau, all of (DE)

(73) Assignee: Komet Praezisionswerkzeuge Robert Breuning GmbH, Besigheim (DE)

( * ) Notice: Subject to any disclaimer, the term of this patent is extended or adjusted under 35 U.S.C. 154(b) by 0 days.

(21) Appl. No.: 09/423,949

(22) PCT Filed: Apr. 24, 1998

(86) PCT No.: PCT/EP98/02450

§ 371 Date: Nov. 12, 1999

§ 102(e) Date: Nov. 12, 1999

(87) PCT Pub. No.: WO98/51438

PCT Pub. Date: Nov. 19, 1998

(30) Foreign Application Priority Data

May 13, 1997 (DE) .............................................. 197 20 022

(51) Int. Cl.$^7$ ..................................................... B23B 27/22
(52) U.S. Cl. .............................. 407/114; 407/33; 408/713
(58) Field of Search ..................................... 407/113, 114, 407/115, 116, 33, 35; 408/713

(56) References Cited

U.S. PATENT DOCUMENTS

| 4,035,888 | * | 7/1977 | Romagnolo | 407/116 |
| 4,194,862 | * | 3/1980 | Zweekly | 408/224 |
| 4,558,975 | * | 12/1985 | Hale | 407/113 |
| 5,226,761 | * | 7/1993 | Satran et al. | 407/114 |
| 5,505,569 | * | 4/1996 | Gustafsson et al. | 407/113 |
| 5,525,016 | * | 6/1996 | Paya et al. | 407/116 |
| 5,695,303 | * | 12/1997 | Boianjiu et al. | 407/114 |
| 5,727,910 | * | 3/1998 | Leeb | 407/114 |
| 5,758,994 | * | 6/1998 | Hintze et al. | 407/116 |
| 5,791,833 | * | 8/1998 | Niebauer | 407/114 |
| 5,839,857 | * | 11/1998 | Paya | 407/114 |
| 5,876,154 | * | 3/1999 | Enderle | 407/114 |
| 5,921,723 | * | 7/1999 | Satran et al. | 407/114 |

FOREIGN PATENT DOCUMENTS

| 25 50 333 | * | 5/1977 | (DE) | 407/114 |
| 28 34 083 | | 2/1980 | (DE) . | |
| 44 22 312 | | 12/1995 | (DE) . | |
| 195 39 462 | | 5/1996 | (DE) . | |
| 197 31 246 A1 | * | 1/1999 | (DE) | 407/113 |
| 046 511 | | 3/1982 | (EP) . | |
| 0 373 292 | | 6/1990 | (EP) . | |
| 0 566 085 | | 10/1993 | (EP) . | |
| 0 710 517 | | 5/1996 | (EP) . | |

(List continued on next page.)

OTHER PUBLICATIONS

VDI–Z 132, 1990, Nr. 1—Januar, S.84, 85.

*Primary Examiner*—A. L. Wellington
*Assistant Examiner*—Erica Ergenbright
(74) *Attorney, Agent, or Firm*—Flynn, Thiel, Boutell & Tanis, P.C.

(57) ABSTRACT

A cutting insert shapes metallic workpieces by chipping. The cutting insert is especially suited for use in solid drills or double-bit cutters. It has at least one cutting edge which is delimited by a chipping face and a flank extends between two cutting corners. The cutting edge includes two sections which form an obtuse angle and in the area of a roof-shaped tip merge into each other. The chipping face has a raised shaped chipping element which extends from the inside of the chipping face as far as the cutting edge, from where it reaches beyond the roof-shaped tip partially across the two sections of the cutting edge. The cutting edge sections and the adjoining chipping faces include a step delimiting the shaped chipping element, the edges of which step serve as additional cutting edges of the shaped chipping element.

20 Claims, 4 Drawing Sheets

FOREIGN PATENT DOCUMENTS

| | | | | |
|---|---|---|---|---|
| 2116081 | * | 9/1983 | (GB) | 407/114 |
| 59-196107 | * | 11/1984 | (JP) | 407/114 |
| 59-196107 | | 3/1985 | (JP). | |
| 9-290307 | * | 11/1997 | (JP) | 407/114 |
| WO94/15741 | | 7/1994 | (WO). | |
| WO94/27772 | | 12/1994 | (WO). | |
| WO96/15869 | | 5/1996 | (WO). | |
| WO 96 18472 | | 6/1996 | (WO). | |

* cited by examiner

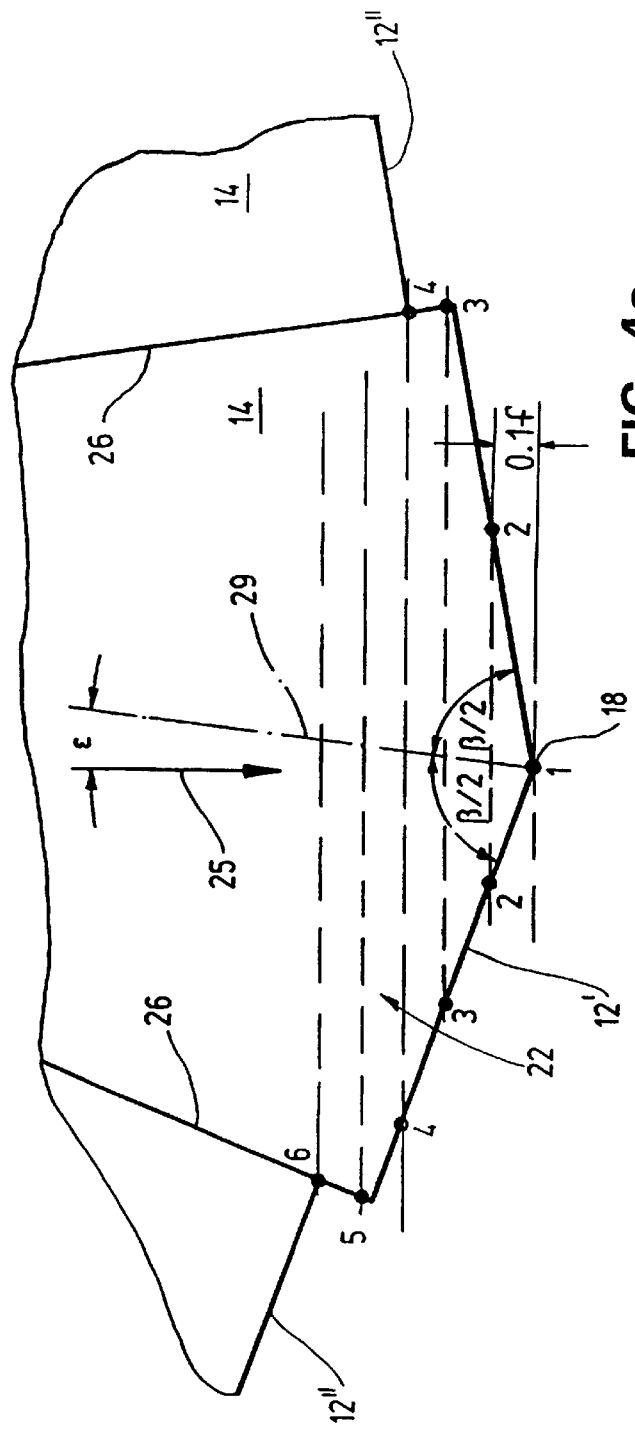
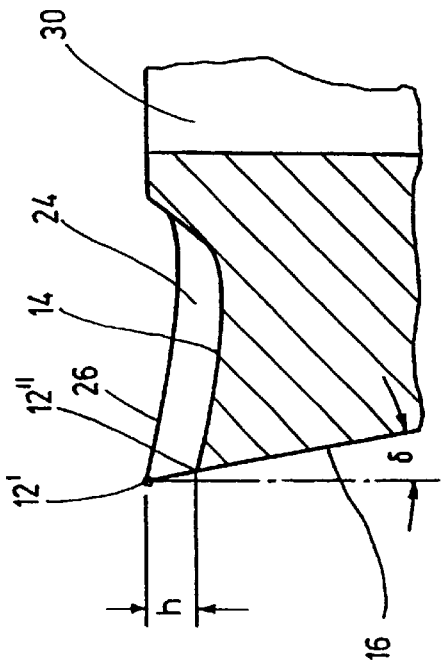
FIG. 4a
FIG. 4b

CUTTING INSERT FOR SHAPING BY CHIPPING

FIELD OF THE INVENTION

The invention relates to a cutting insert for shaping preferably by chipping of metallic workpieces with at least one cutting edge extending between two cutting corners and defined by a chipping face and a flank. The cutting edge has two at least partly active cutting edge sections forming an obtuse angle where they merge into each other in the area of a roof-shaped tip, whereby the chipping face has at least one raised shaped chipping element.

BACKGROUND OF THE INVENTION

Cutting inserts with such shaped chipping elements are known, for example from DE-A-44 22 312. The shaped chipping elements end in said reference in front of the cutting edge and extend wedge-shaped in the direction of the cutting edge. The raised shaped chipping elements do indeed achieve separation of the chips from one another at certain points through a purposeful power inclusion so that the stable chip cross section is weakened and the power action coming from the chip into the cutting insert is reduced. Also the chipping characteristics of the conventional cutting insert leave much to be desired in particular during the start of drilling.

Starting out from this, the basic purpose of the invention is to provide a cutting insert for shaping by chipping of the above-disclosed type, which is distinguished through particularly favorable characteristics during the start of drilling through structured chip formation and through quiet chipping.

SUMMARY OF THE INVENTION

The basic idea of the invention is that through a division of the cutting edge into leading and trailing cutting edge portions, there is achieved a soft drilling start and a stable true-to-size boring operation without lateral deflection of the respective tool. To achieve this, it is suggested according to the invention that the raised shaped chipping element extend from the inside of the chipping face to the cutting edge, and thereat extend to form the roof-shaped tip partially over the two cutting edge sections.

A particularly favorable guiding behavior over the entire boring operation is achieved when the edge sections and the adjacent chipping face portions have a step defining the shaped chipping element, and when the cutting edge sections extend preferably continuously risingly from the bottom edge of the step toward the cutting corner. The cutting edge sections reach advantageously in their extent toward the cutting corners essentially the level of the cutting edges in the area of the shaped chipping element. It has proven to be particularly advantageous when the step edges extending over the chipping face form an angle of 90° to 110° with the associated cutting edge section on their sides facing the respective cutting corner, and thereby function as independent additional cutting edges of the shaped chipping element. In order to achieve a dividing of the chips in the area of the shaped chipping step, it can be advantageous when the step surfaces defining the additional cutting edges form an acute angle of 75° to 88° with the adjacent leading chipping face portions. The main and additional cutting edges of the shaped chipping element, which edges lead during the cutting operation, result, because of their supporting function, in a better guiding behavior and in a reduction of vibration creation in particular in the range of upper vibrations with high frequencies, and thus reducing the creation of noise. In order to improve the guiding behavior without a chip division in the area of the shaped chipping element, it is advantageous when the step surfaces defining the additional cutting edges form an obtuse angle of 70° to 88°, preferably 75° to 85°, with the adjacent leading chipping face portions. It has been proven to be particularly advantageous for this purpose when the length of the cutting edge in the area of the shaped chipping element is 15% to 40% of the entire cutting edge length.

To improve the force balance during the cutting operation, it is possible to design the shaped chipping element also asymmetrically with respect to the roof-shaped tip. In particular, it is possible for this purpose that the leading cutting edges and chipping face portions extend declined toward one cutting corner and inclined toward the other cutting corner.

In order to improve the guiding behavior of a boring tool equipped with the cutting elements of the invention, in particular during the start of drilling, it is suggested according to a preferred embodiment of the invention that the equation $$h = a \cdot f / \tan \delta$$

is applied to the step height of the shaped chipping element, wherein f is the tool feed per rotation of the machine tool, δ is the clearance angle in the area of the leading cutting edge portion, and a is a factor=0.2 to 1.5, preferably 0.3 to 0.8.

In order to improve the chip formation and chip removal, the chipping faces extend concavely in the area of the shaped chipping element and outside of the shaped chipping element each from the cutting edge initially dropping and then rising up to a plateau remote from the edge. A further improvement in this respect is achieved by the chipping angle continuously decreasing from the step edges of the shaped chipping element toward the cutting corner.

The cutting inserts of the invention are preferably utilized in solid drills or in double cutters with at least two cutting inserts.

BRIEF DESCRIPTION OF THE DRAWINGS

The invention will be discussed in greater detail hereinafter in connection with one exemplary embodiment schematically illustrated in the drawings, in which:

FIG. 4a illustrates an enlarged cutout of FIG. 3 in the area of the shaped chipping element;

FIG. 4b is a cross-sectional view along the line of intersection IV—IV of FIG. 3.

DETAILED DESCRIPTION

Figure 1:
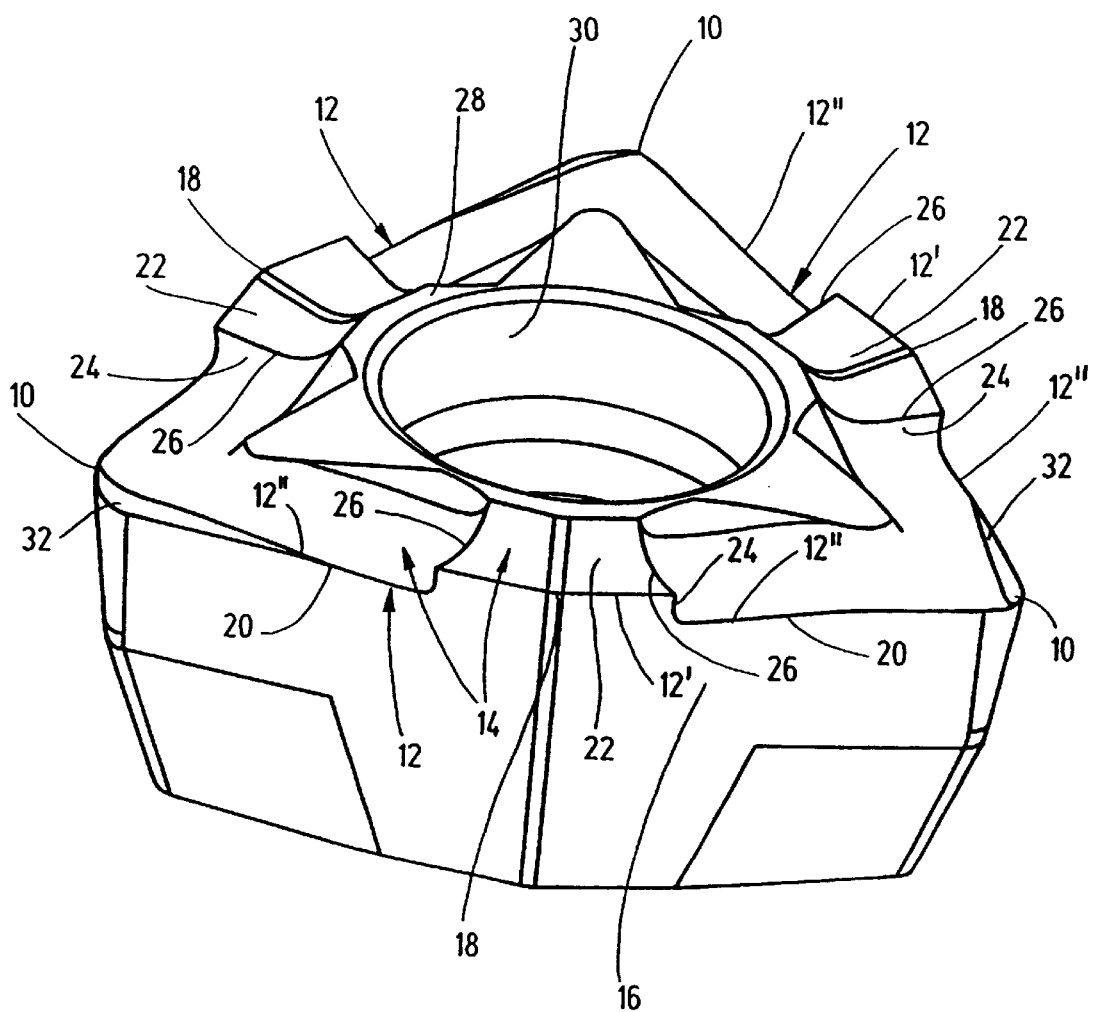
FIG. 1 is a diagrammatic illustration of a cutting insert for the shaping by chipping.

The cutting insert illustrated in the drawings is mainly designated for drilling tools, like solid drills or double-cutting drills. It is designed as an indexable insert with a hexagonal contour, the three cutting edges 12 of which, which cutting edges are connected with one another at the cutting corners 10 defining an acute angle α, are defined by a chipping face 14 and a flank 16, and each have two edge sections 20 merging into one another while forming an obtuse angle β in the area of a roof-shaped tip 18. Depending on how the indexable insert is chucked, one of the cutting edges is active with the associated cutting edge sections 20. The chipping face 14 associated with each cutting edge 12 has a raised shaped chipping element extending from the interior of the chipping face 14 to the respective cutting edge 12, and extends there partially beyond the two cutting edge sections 20 to define the roof-shaped tip 18. The cutting edge sections 20 and the adjacent chipping face portions 14 have a step 24 limiting the shaped chipping element 22, the edges 26 of which form an angle γ>90°, shown in FIG. 3, with the respective cutting edge section on their sides facing the respective cutting corner 10, and form a leading additional cutting edge, which is part of the leading cutting edge 12' in the area of the shaped chipping element 22. The length of the leading cutting edge 12' in the area of the shaped chipping element 22 is, in the illustrated exemplary embodiment, approximately 25% of the entire cutting edge length, whereas the height h of the step 24 of the shaped chipping element 22 is determined according to the equation $$h = a \cdot f / \tan \delta,$$

whereby f is the tool feed per rotation (FIG. 4a), δ is the clearance angle in the area of the leading cutting edge portion 12' (FIG. 4b), and the factor a is approximately 0.5 in the exemplary embodiment illustrated in FIG. 4a. The feed direction is indicated by the arrow 25 in FIG. 4a, whereas the dashed lines 1, 2, 3, 4, 5 and 6, which are perpendicular with respect to the feed direction 25, indicate the position of the cutting insert, each being a tenth of a rotational step (0.1 f) within the workpiece. FIG. 4a shows that the angle bisector 29 of the roof-shaped tip 18 forms an acute angle ε with the feed direction 25. A time-dependent shifting of the points of engagement at the cutting edge sections thus results, during the start of drilling, which depending on the angle ε can vary. It is important that when reaching the end of the leading cutting edge 12' a certain period of time passes until the trailing sections 12" of the cutting edge engage. This delay amounts in the illustrated exemplary embodiment to approximately one half of a rotation of the respective tool. The shaped chipping element 22 digs during this half rotation a track into the workpiece, which acts to center and stabilize.

The trailing cutting edge sections 12" have a shape continuously increasing from the bottom edge of the step 24 toward the cutting corner 10 and a rake angle continuously decreasing along said stretch. The cutting edges 12 are partially chamfered (chamfer 32) in the area of the cutting corners 10, dependent on the direction of rotation of the tool. The chipping faces 14 have both in the area of the shaped chipping element 22 and also in the area between the steps 24 and the cutting corners 10 a concave shape, which initially drops from the cutting edge 12', 12" and then rises to a plateau 28 remote from the edge (compare FIG. 2). An opening 30 exists in the center of the plateau 28 for penetration by a not-illustrated fastening screw.

Figure 2:
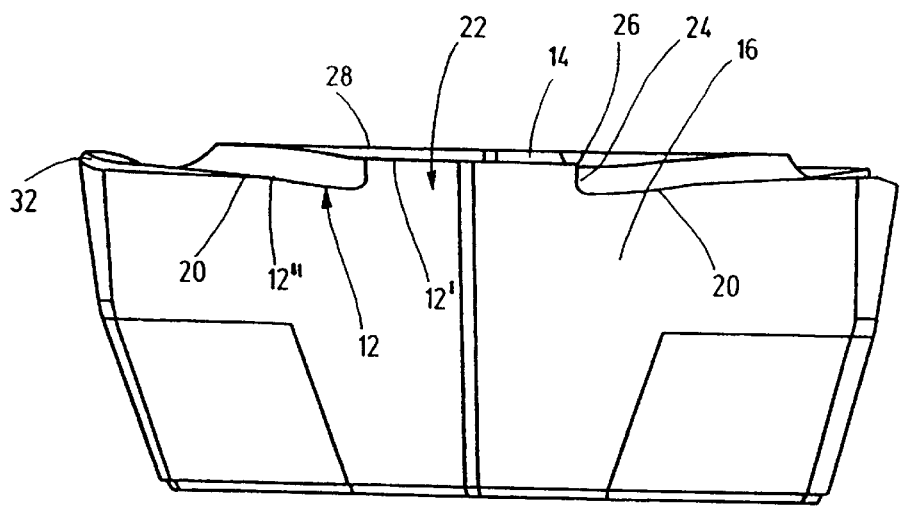
FIG. 2 is a side view of the cutting insert in the direction of the flank.
Figure 3:
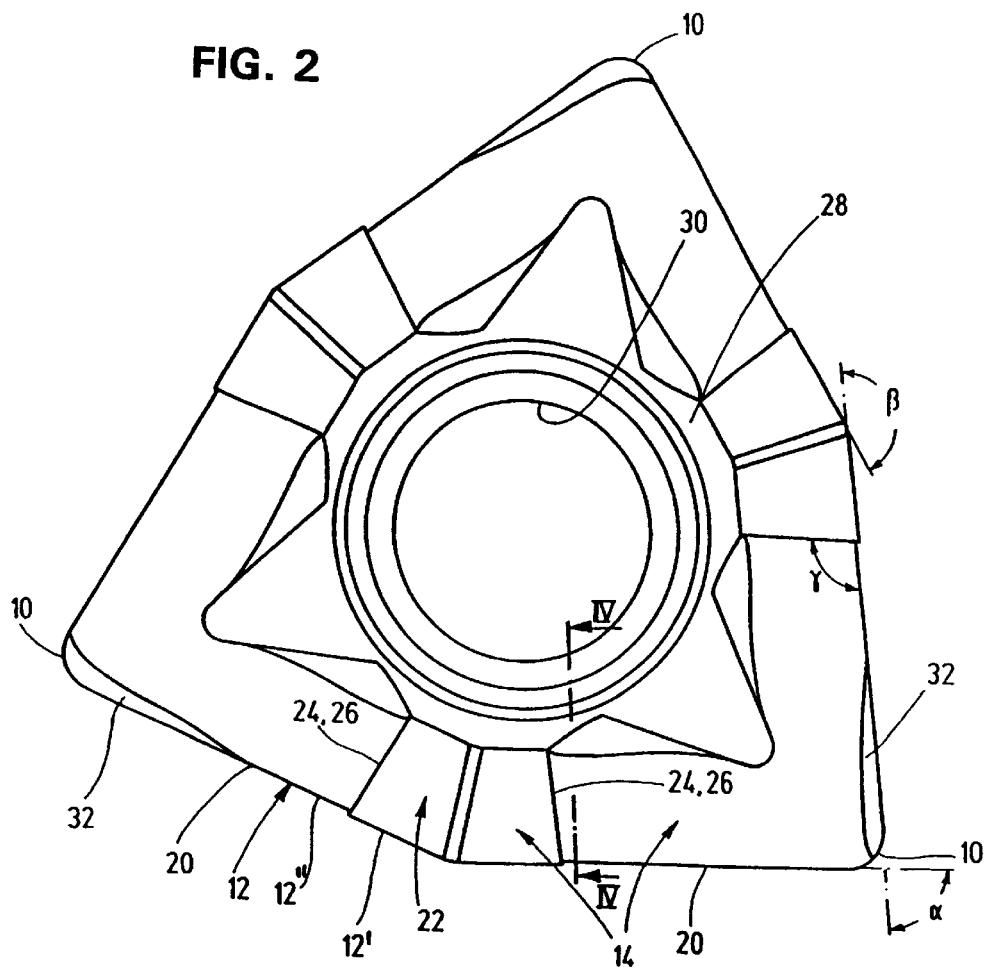
FIG. 3 is a top view of the cutting insert in the direction of the chipping face.
Figure 5A:
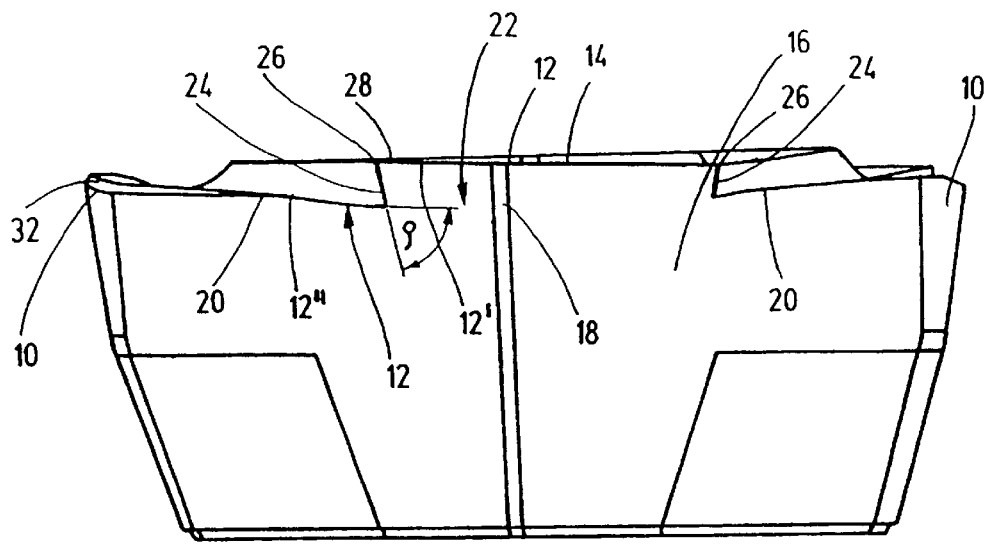
FIGS. 5a and 5b illustrate a modified exemplary embodiment of a cutting insert according to FIGS. 2 and 3.
Figure 5B:
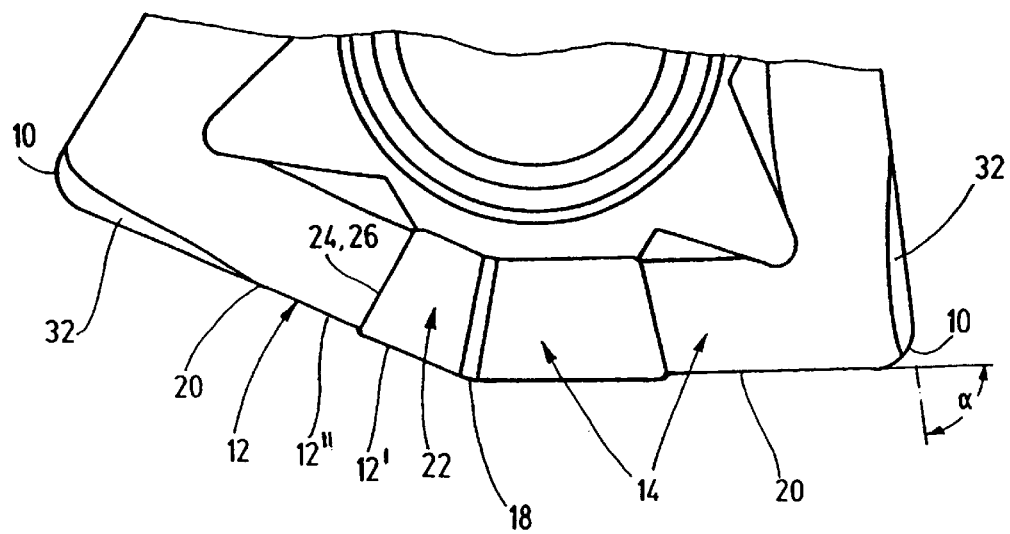

The exemplary embodiment according to FIGS. 5a and 5b differs from the one shown in FIGS. 2 and 3 in that the shaped chipping element 22 is arranged asymmetrically with respect to the roof shaped or projecting tip 18 and extends in a reduced slope incline toward a (right) cutting corner 10 and in an increased slope toward the other (left) cutting corner 10. This measure makes it possible to achieve, with the cutting elements overlapping one another in the tool, a radial force balance during the drilling operation, in particular during the start of drilling operation. FIG. 5a furthermore shows that the additional cutting edge 26 of the shaped chipping element is undercut in the area of the step 24 with a cutting angle ρ. It is possible with this structure to cause a chip shaping favorable for the chip removal or chip division.

In conclusion the following is stated: The invention relates to a cutting insert for shaping by chipping of metallic workpieces. The cutting insert is suited mainly for use in solid drills or in double bit cutters. It has at least one cutting edge 12 extending between two cutting corners 10 and formed by a chipping face 14 and a flank 16, which cutting edge 12 has two at least partly active cutting edge sections 20, which define an obtuse angle while merging into each other in the area of a roof-shaped tip 18. A raised shaped chipping element is provided on the chipping face, which element extends from the interior of the chipping face 14 to the cutting edge 12 and there extends beyond the two cutting edge sections 20 to define the roof-shaped tip 18. The cutting edge sections 20 and the adjacent chipping faces 14 have a step limiting the shaped chipping element 22, the edges 26 of which step function as additional cutting edges of the shaped chipping element 22.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A cutting insert for shaping metallic workpieces by chipping, comprising at least one cutting edge extending between two cutting corners and defined by a chipping face having chipping face portions and a flank, the at least one cutting edge having two at least partly active cutting edge sections that form an obtuse angle (β) and merge into each other in an area including a projecting tip, whereby the chipping face includes a raised shaped chipping element that extends from an interior of the chipping face to the at least one cutting edge and extends partially over the two cutting edge sections forming the projecting tip.

2. The cutting insert according to claim 1, wherein each of the cutting edge sections and the respective adjacent chipping face portions have a step with a step edge defining the shaped chipping element.

3. The cutting insert according to claim 2, wherein a trailing cutting portion of the at least one cutting edge that is provided outside of the shaped chipping element, extends continuously rising from a respective bottom edge of the step toward the respective adjacent cutting corner.

4. The cutting insert according to claim 3, wherein the trailing portion of the at least one cutting edge reaches in its extent toward the respective cutting corner essentially a level of a leading portion of the at least one cutting edge, said leading portion being provided as a cutting edge of the shaped chipping element.

5. The cutting insert according to claim 3, wherein the chipping face extends concavely in an area between each step and the adjacent cutting corner from the trailing cutting portion of the at least one cutting edge initially dropping and then rising up to a plateau remote from the at least one cutting edge.

6. The cutting insert according to claim 3, wherein a chipping angle of the trailing cutting portion decreases continuously from the respective step toward the adjacent cutting corner.

7. The cutting insert according to claim 2, wherein opposing step edges extend over the chipping face to form an included angle (γ) of 80° to 120° with the associated cutting edge section.

8. The cutting insert according to claim 7, wherein the opposing edges of the steps are designed as additional cutting edges of the shaped chipping element.

9. The cutting insert according to claim 8, wherein step surfaces limiting the additional cutting edges form an acute angle (ρ) of 75° to 88° with the adjacent chipping face portions.

10. The cutting insert according to claim 8, wherein the step surfaces limiting the additional cutting edges form an obtuse angle (ρ) of 92° to 110° with the adjacent leading chipping face portions.

11. The cutting insert according to claim 1, wherein the chipping face extends concavely in an area of the shaped chipping element from a leading cutting portion of the at least one cutting edge, initially declining and then inclining to a plateau remote from the at least one cutting edge.

12. The cutting insert according to claim 1, wherein a length of a leading cutting portion of the at least one cutting edge is 15% to 50% of an entire length of the at least one cutting edge in the area of the shaped chipping element.

13. The cutting insert according to claim 1, wherein the shaped chipping element is asymmetric with respect to the projecting tip.

14. The cutting insert according to claim 1, wherein a leading cutting portion of the at least one cutting edge extends inclined dropping toward one cutting corner and inclined rising toward the other cutting corner.

15. The cutting insert according to claim 1, wherein the at least one cutting edge is one of at least three cutting edges that limit a polygon, each of the at least three cutting edges being defined by two edge sections, the two cutting corners being two of at least three cutting corners respectively provided between the at least three cutting edges to form the polygon.

16. A machine tool for being shifted and turned relative to a workpiece during a machining operation, the machine tool having a cutting insert including:

at least one cutting edge extending between two cutting corners and defined by a chipping face having chipping face portions and a flank, the at least one cutting edge having two at least partly active adjacent cutting edge sections which form an obtuse angle and merge into each other in an area of a projecting tip; and a raised shaped chipping element that extends from an interior of the chipping face to the at least one cutting edge and that extends partially over the two cutting edge sections forming the projecting tip, the adjacent chipping face portions each having a step defining the shaped chipping element, a height h for each step being defined by an equation:

$$h = a \cdot f / \tan \delta$$

wherein a is a factor between 0.2 and 1.5, f is tool feed per rotation of the tool, and δ is a clearance angle in an area of a leading portion of the at least one cutting edge.

17. The machine tool according to claim 16, wherein the machine tool comprises a solid drill, said cutting insert including at least three of said cutting edges and at least three cutting corners.

18. The machine tool according to claim 16, wherein the machine tool comprises a double bit cutter with at least two of said cutting inserts, each of said cutting inserts including at least three of said cutting edges and at least three cutting corners.

19. A cutting insert for shaping metallic workpieces comprising:

at least two partly active cutting edge sections that merge into each other at an area;

a projecting tip formed at part of the area where the cutting edge sections merge;

a further cutting edge extending between two cutting corners and defined by a chipping face and a flank, the chipping face and the flank being defined by surfaces of the cutting edge sections; and steps extending from an interior of the chipping face to the cutting edge and extending partially over the two cutting edge sections and forming the tip, the step defining a raised shaped chipping element, wherein the raised shaped chipping element includes a leading cutting portion which is part of the further cutting edge and opposing edges adjacent the chipping face.

20. The cutting insert according to claim 19, wherein the tip formed at the area where the cutting edge sections merge extends outwardly beyond the two cutting edge sections.

* * * * *